(12) United States Patent
Thakker et al.

(10) Patent No.: US 11,567,479 B2
(45) Date of Patent: Jan. 31, 2023

(54) EARLY WARNING SYSTEM FOR FOOD SAFETY VIOLATION AND METHOD THEREOF

(71) Applicant: Stellar iDea Labs, Rockville, MD (US)

(72) Inventors: Dipak Thakker, Rockville, MD (US); Joshua Sircus, North Potomac, MD (US); Madhu Siddalingaiah, Clarksburg, MD (US)

(73) Assignee: Stellar iDea Labs, Rockville, MD (US)

( * ) Notice: Subject to any disclaimer, the term of this patent is extended or adjusted under 35 U.S.C. 154(b) by 0 days.

(21) Appl. No.: 17/524,993

(22) Filed: Nov. 12, 2021

(65) Prior Publication Data

US 2022/0155757 A1 May 19, 2022

Related U.S. Application Data

(60) Provisional application No. 63/198,842, filed on Nov. 16, 2020.

(51) Int. Cl.
*G06Q 50/26* (2012.01)
*G05B 19/4155* (2006.01)

(52) U.S. Cl.
CPC ....... *G05B 19/4155* (2013.01); *G06Q 50/265* (2013.01); *G05B 2219/50333* (2013.01)

(58) Field of Classification Search
CPC ...... G05B 19/4155; G05B 2219/50333; G06Q 50/265
See application file for complete search history.

(56) References Cited

U.S. PATENT DOCUMENTS

| | | | |
|---|---|---|---|
| 4,989,990 A | 2/1991 | Lehmann | |
| 6,817,757 B1 * | 11/2004 | Wallace | G01K 1/024 374/E1.004 |
| 7,019,638 B1 * | 3/2006 | Wallace | G05D 23/1934 374/E1.004 |
| 9,927,304 B2 | 3/2018 | Yin et al. | |
| 10,022,008 B1 * | 7/2018 | Staton | A47J 43/287 |
| 2002/0000092 A1 * | 1/2002 | Sharood | G06Q 20/105 62/127 |
| 2005/0248455 A1 * | 11/2005 | Pope | G06K 19/0717 374/E1.004 |
| 2007/0220907 A1 * | 9/2007 | Ehlers | H02J 3/14 62/126 |
| 2009/0222235 A1 * | 9/2009 | Vaillant | G01K 3/04 374/102 |
| 2010/0127880 A1 * | 5/2010 | Schechter | G01K 1/024 340/584 |
| 2010/0127881 A1 * | 5/2010 | Schechter | G06F 11/0709 340/584 |

(Continued)

FOREIGN PATENT DOCUMENTS

KR 102116613 B1 6/2020

*Primary Examiner* — Gary Collins
(74) *Attorney, Agent, or Firm* — Dave Law Group LLC; Raj S. Dave

(57) ABSTRACT

Embodiments relate to a system comprising a device for temperature recording; an integrated communication module; a memory; a processor coupled with the memory. The processor is configured to: receive data from the device, analyze the data through an analytics module; predict an anomaly in the data through the analytics module; generate an alert for ensuring quality of food and safety of the food; and predict a failure in the device.

21 Claims, 6 Drawing Sheets

(56) References Cited

U.S. PATENT DOCUMENTS

| | | | |
|---|---|---|---|
| 2014/0313055 A1* | 10/2014 | Warkentin | G01N 33/02 |
| | | | 340/870.16 |
| 2014/0333439 A1* | 11/2014 | Downing | A01K 11/006 |
| | | | 374/186 |
| 2015/0300887 A1* | 10/2015 | Mandava | G01N 33/02 |
| | | | 702/130 |
| 2016/0260059 A1* | 9/2016 | Benjamin | H04W 4/027 |
| 2017/0365157 A1 | 12/2017 | Shoari et al. | |
| 2018/0003572 A1* | 1/2018 | Garsd | G01K 13/00 |
| 2018/0120169 A1* | 5/2018 | Jackson | G06Q 10/00 |
| 2018/0224150 A1 | 8/2018 | Lewis et al. | |
| 2019/0265082 A1* | 8/2019 | Zafar | G06N 20/10 |
| 2021/0059280 A1* | 3/2021 | Duggan | A23L 3/00 |
| 2021/0144802 A1* | 5/2021 | Zafar | H04W 84/04 |
| 2022/0019802 A1* | 1/2022 | Nassar | G06V 20/41 |

* cited by examiner

EARLY WARNING SYSTEM FOR FOOD SAFETY VIOLATION AND METHOD THEREOF

CROSS-REFERENCE TO RELATED APPLICATIONS

This application claims the benefit under 35 U.S.C. § 119 of U.S. Provisional Application No. 63/198,842, filed on Nov. 16, 2020, which is hereby incorporated by reference in its entirety.

FIELD OF THE INVENTION

This invention relates to an early warning system and method for food safety violation. The invention particularly relates to an early warning system and method for food safety violation utilizing the internet of things.

BACKGROUND

In this section the prior art relevant to the field are cited.

"This disclosure describes methods and apparatus for hygiene monitoring in chain restaurants and grocery superstores. Four sub-systems are introduced to take care of different aspects of hygiene in restaurants. One sub-system uses contactless and in-contact temperature sensors installed on appliances to constantly monitor the temperature of working appliances to be in pre-defined range and use an Internet of Things gateways to transmit the data to remote control unit. The system generates an alert or report if the temperature of the appliances falls beyond the predefined range for more than a specific period of time. Another sub-system uses a combination of temperature, humidity, UV, and gas detectors to monitor the environment to be unsuitable for growth of fungus and bacteria and alert in case of exposure to harmful material and sun radiation. This sub-system also use an Internet of Things gateways to transmit the data to remote control unit. The third sub-system use a combination of radio frequency tags attached to the staff, RF tag readers and infrared/proximity/motion/microphone/touch sensors installed over the faucet and dispenser to monitor if the staff wash their hands properly after going to the restroom. The fourth sub-system automatically generate food expiring label for opened cans and food container based on RF tag worn by the staff. The system generates and print the label whenever the staff gesture their RF tags in front of them and potentially scan the container bar code or select it from a drop-down menu on its touch screen. The last sub-system can also monitor the inventory of opened cans of food in the refrigerator and provide a report or alert when they the time gets close to expiration date." [Source: Apparatus and methods for hygiene monitoring in restaurants and grocery superstores; Arian Shoari, Mona Komeijani; published as US20170365157A1 on Dec. 21, 2021]

"A food temperature remote control system using a food temperature measuring device having a LoRa remote communication function, the food temperature measuring device measuring the temperature by contacting or non-contacting the food and transmitting the food temperature measurement value through the LoRa wireless communication network. An IoT data server that stores a food temperature measurement value transmitted from the food temperature measurement device through a wireless communication network and provides a web service or app service for managing the food measurement value to a client terminal; The IoT data server includes a wireless communication unit for communicating with the client terminal and the food temperature meter, a food temperature database for storing food temperature transmitted from the temperature meter, and the food to provide an app-based service to the client terminal. Food temperature search unit for searching the food temperature in the temperature database, a food temperature monitoring unit for monitoring the food temperature based on the data stored in the food temperature database, for setting the proper temperature of the food and the upper or lower limit temperature of the food It is characterized by including an upper/lower limit setting unit, an alarm unit for generating an alarm, and a food temperature management control unit for controlling each component of the IoT data server. With this configuration, the food temperature information measured by the food temperature meter is transmitted to the remote management server, so that the manager can check and manage the food temperature in real time." [Source: Food thermometer having LoRa communication function and remote managing system using this; application in Korean; published as KR102116613B1 on Jun. 5, 2020]

"Examples provide a system for monitoring an open container. A set of sensors captures sensor data associated with one or more items within an open container, such as, but not limited to, a food warmer or a refrigerated/freezer display case. The set of sensors may include one or more infrared (IR) cameras. The set of sensors transmits the sensor data to a monitoring component. The monitoring component processes the sensor data to identify factor(s) associated with one or more items, such as temperature, location of the item, state changes, and freshness of the one or more items. If a factor for a given item exceeds a predetermined threshold value for that factor, the monitoring system outputs an alert notification to a user interface." [Source: System for monitoring an open container; Steven Lewis, Nicholaus Adam Jones, Matthew Dwain Biermann; published as: US20180224150A1 on Aug. 9, 2018]

"Technology described herein relates to overcoming technical challenges associated with operation of technology for the purposes of implementing quality assurance practices in a food preparation environment. To this end, embodiments include custom handheld devices including a set of input devices (including token reader inputs and temperature sensing inputs) and a user interface device (for example a touchscreen), these devices being configured to guide a user through data collection processes." [Source: A device for electronically measuring temperature of a food item at predetermined milestones; David Cox, Kean Maizels; published as WO2019218017A1 on Nov. 21, 2019]

"A method and arrangement for providing an indication of a temperature state of open container bodies during in-line handling. The container bodies are conveyed along a conveyance path, with the openings of the container bodies being freely accessible. A pyro-electric detector is positioned along the conveyance path of the openings facing the conveyance path of the openings. An opening of one of the containers is detected upon reaching a position opposite the pyro-electric detector, and the pyro-electric detector measures heat radiation from the opening detected as having reached the position opposite the pyro-electric detector. The heat radiation measured determines the overall thermal energy content of the open container body as the temperature state thereof" [Source Method and arrangement for measuring a temperature state of open container bodies; Martin Lehmann; published as U.S. Pat. No. 4,989,990 on Feb. 5, 1991]

"The invention proposes a method of determining core temperature of food in a closed container, the method including the steps of: adjusting heating power supplied to the container to allow internal temperature of the container to change within a predetermined duration; obtaining information related to the change of internal temperature of the container; and determining the core temperature of the food based on the information related to the change of internal temperature and predetermined relationships between information related to change of internal temperature of the container and core temperatures of the food. The invention also proposes an apparatus for determining core temperature of food and a food processing device." [Source: Apparatus and method for determining core temperature of food, Bin Yin, Ling Cao; published as U.S. Pat. No. 9,927,304 on Mar. 27, 2018]

However, current systems and methods do not provide an early warning system for food safety violation that predicts anomaly in the food safety as well as anomaly in a device used for temperature recording. Considering the knowledge of the persons skilled in the art, there is a long-felt need for an early warning system and method for food safety violation that predicts food safety violations as well as predict the anomaly in the temperature recording device of the early warning system.

SUMMARY

An embodiment refers to a device, comprising: a first sensor; a timer; a controller; an integrated communication module; a power source. The device is for temperature recording.

In an embodiment of the device, the device is an internet of things device for temperature recording.

In an embodiment of the device, the device is assigned and tracked through a unique identification number.

In an embodiment of the device, the first sensor is a non-contact sensor.

In an embodiment of the device, the device is configured to collect data and send it to a cloud to perform predictive analytics.

In an embodiment of the device, the device is configured to collect data of exposed food.

In an embodiment of the device, the device further comprises a second sensor to measure:

a humidity, and a pressure.

In an embodiment of the device, the first sensor comprises a low voltage temperature sensor.

In an embodiment of the device, the low voltage temperature sensor is configured for measuring hot temperature.

In an embodiment of the device, the first sensor comprises one of a: high precision infrared array sensor and an infrared camera.

In an embodiment of the device, the first sensor is a Micro-Electro-Mechanical Systems (MEMS) sensor.

In an embodiment of the device, the first sensor is configured for measuring cold temperature.

In an embodiment of the device, the timer keeps a record of time to put the device in a sleep mode.

In an embodiment of the device, the device is configured to go in a sleep mode and wake-up at certain time intervals for collecting data.

In an embodiment of the device, the power source comprises at least one of a battery, and an USB cable.

In an embodiment of the device, the device comprises a third sensor, in case the power source comprises the battery.

In an embodiment of the device, the third sensor comprises a voltage sensor to measure voltage of the power source in case the power source comprises a battery.

In an embodiment of the device, the controller is configured to: receive data from the first sensor; receive the data from the second sensor; and send the data to a cloud through the integrated communication module.

In an embodiment of the device, the data comprises: timestamp including a time, a day, a week, a year, a holiday, weather data, point of sale data.

In an embodiment of the device, the integrated communication module comprises a Wi-Fi® trans-receiver.

In an embodiment of the device, the device is accessed through one of a web portal and an application programming interface from a cloud for predictive analytics.

In an embodiment of the device, the device is controlled through one of a web portal and an application programming interface for predictive analytics.

In an embodiment of the device, control of the device is device agnostic.

In an embodiment of the device, the predictive analytics is performed through an artificial intelligence and machine learning techniques.

In an embodiment of the device, the artificial intelligence and machine learning technique are embedded in a cloud.

An embodiment refers to a system comprising: a device for temperature recording; and an analytic system further comprising: an integrated communication module; a memory; a processor coupled with the memory, wherein the processor is configured to: receive data; analyze the data through an analytics module; predict an anomaly in the data through the analytics module; generate an alert for ensuring quality of a food and safety of the food; and predict a failure in the device.

In an embodiment of the system, the system comprises a plurality of devices communicatively coupled to the analytic system through a cloud.

In an embodiment of the system, the device is assigned a unique identification number.

In an embodiment of the system, the device is tracked through the unique identification number.

In an embodiment of the system, the data comprises: a temperature, a humidity, a pressure, time, and voltage data.

In an embodiment of the system, the data comprises: timestamp including a time, a day, a week, a year, a holiday, weather data, point of sale data.

In an embodiment of the system, the integrated communication module is a Wi-Fi® trans-receiver.

In an embodiment of the system, the data is received from the device through a cloud.

In an embodiment of the system, the system continuously compares a fluctuation in the data with a pre-set value for detecting the anomaly in the data.

In an embodiment of the system, the pre-set value comprises the pre-set value of: a temperature, a humidity, a pressure, time, and voltage.

In an embodiment of the system, the pre-set value is according to a food safety standard.

In an embodiment of the system, the system continuously monitors the data for detecting the anomaly in the data.

In an embodiment of the system, the system reports a warning when the anomaly is detected.

In an embodiment of the system, the alert is generated when the anomaly is detected.

In an embodiment of the system, the alert is one of a notification, message, and an email.

In an embodiment of the system, an analytics module analyses the data and predicts the anomaly in the data, using predictive analytics.

In an embodiment of the system, the analytics module predicts the failure in the device, using the predictive analytics.

In an embodiment of the system, the predictive analytics is performed through an artificial intelligence and machine learning technique.

In an embodiment of the system, the artificial intelligence and machine learning technique are embedded in a cloud.

In an embodiment of the system, an analyzed data is displayed on a dashboard for interaction with a user.

In an embodiment of the system, the analytics module analyzes temperature data, using thermodynamic heat flow models to predict an actual food temperature in order to improve the quality of the food and the safety of the food.

In an embodiment of the system, in case of anomaly detected in the data, the processor is configured to automatically control a heating equipment and a cooling equipment to maintain a pre-set temperature.

In an embodiment of the system, the analytics module predicts time to replace the food based upon analysis of the data.

In an embodiment of the system, the analytics module is configured to detect improperly placed food containers.

In an embodiment of the system, the processor is configured to send the alert to a user for the improperly placed food containers.

In an embodiment of the system, the alert is one of a notification, message, and an email.

In an embodiment of the system, the analytics module is configured to diagnose a problem in the device and a heating equipment and cooling equipment.

In an embodiment of the system, the analytics module is configured to diagnose the problem by analyzing a pattern of change in the data.

In an embodiment of the system, the pattern of change in the data is one of a gradual increase and a gradual decrease and a constant fluctuation in the data over a period of time.

In an embodiment of the system, the analytics module is configured to predict the failure in the device and a heating equipment and a cooling equipment.

In an embodiment of the system, the system fails to receive the data in case of failure in the device, the heating equipment, and the cooling equipment.

In an embodiment of the system, the analytics module is configured to predict a time to replace a sensor battery based upon analysis of voltage data.

In an embodiment of the system, the analytics module is configured to schedule a maintenance of the device, the heating equipment and the cooling equipment based upon analysis of the data.

An embodiment refers to a method for temperature recording comprising: receiving data; analyzing the data through an analytics module; predicting an anomaly in the data through the analytics module; generating an alert for ensuring a quality of a food and a safety of the food; and predicting a failure in a device.

In an embodiment of the method, the method comprises: assigning a unique identification number to the device.

In an embodiment of the method, the method comprises: tracking the device through the unique identification number.

In an embodiment of the method, the data comprises: a temperature, a humidity, a pressure, time, and voltage.

In an embodiment of the method, the data comprises: timestamp including a time, a day, a week, a year, a holiday, weather data, point of sale data.

In an embodiment of the method, the receiving of the data is from the device through a cloud.

In an embodiment of the method, the method comprises: comparing the data continuously with a pre-set value for fluctuations in a value of the data for detecting the anomaly in the data.

In an embodiment of the method, the pre-set value comprises pre-set value of: a temperature, a humidity, a pressure, time, and voltage.

In an embodiment of the method, the pre-set value is according to a food safety standard.

In an embodiment of the method, the data is continuously monitored for detecting the anomaly in the data.

In an embodiment of the method, a warning is reported when the anomaly is detected.

In an embodiment of the method, the alert is generated when the anomaly is detected.

In an embodiment of the method, the alert is one of a notification, message, and an email.

In an embodiment of the method, analyzing the data and predicting the anomaly in the data is done through the analytics module using predictive analytics.

In an embodiment of the method, predicting the failure in the device is done through the analytics module using a predictive analytics.

In an embodiment of the method, the predictive analytics is performed through an artificial intelligence and machine learning technique.

In an embodiment of the method, the artificial intelligence and machine learning technique are embedded in a cloud.

In an embodiment of the method, the method comprises: displaying an analyzed data on a dashboard for interaction with a user.

In an embodiment of the method, the method comprises: analyzing the data using thermodynamic heat flow models for predicting an actual food temperature in order to improve the quality of the food and the safety of the food.

In an embodiment of the method, the method comprises: controlling a heating equipment and a cooling equipment automatically to maintain a pre-set temperature when the anomaly in the data is detected.

In an embodiment of the method, the method comprises: predicting a time to replace the food based upon analysis of the data by the analytics module.

In an embodiment of the method, the method comprises: detecting improperly placed food containers by analyzing the data by the analytics module.

In an embodiment of the method, the method comprises: sending the alert to a user for improperly placed food containers.

In an embodiment of the method, the alert is one of a notification, message, and an email.

In an embodiment of the method, the method comprises: diagnosing a problem in the device and the heating equipment and the cooling equipment.

In an embodiment of the method, the method comprises: diagnosing the problem by analyzing a pattern of change in the data.

In an embodiment of the method, the pattern of change in the data is a gradual increase, decrease and a constant fluctuation in the data over a period.

In an embodiment of the method, the method comprises: predicting the failure in the device, the heating equipment, and the cooling equipment through the analytics module.

In an embodiment of the method, the method comprises: failing to receive the data in case of failure in the device, the heating equipment, and the cooling equipment.

In an embodiment of the method, the method comprises: predicting a time to replace a sensor battery based upon the analyzing of a voltage data.

In an embodiment of the method, the method comprises: scheduling maintenance of the device, the heating equipment, and the cooling equipment.

An embodiment refers to a non-transitory computer storage medium storing a sequence of instructions, which when executed by a processor, causes: receiving data from one or more devices; analyzing the data through an analytics module; predicting an anomaly in the data through the analytics module; generating an alert for ensuring quality of food and safety of the food; and predicting a failure in the device.

BRIEF DESCRIPTION OF THE FIGURES

The embodiments of this invention are illustrated by way of example and not limitation in the figures of the accompanying drawings, in which like references indicate similar elements and in which.

DETAILED DESCRIPTION

Figure 1:
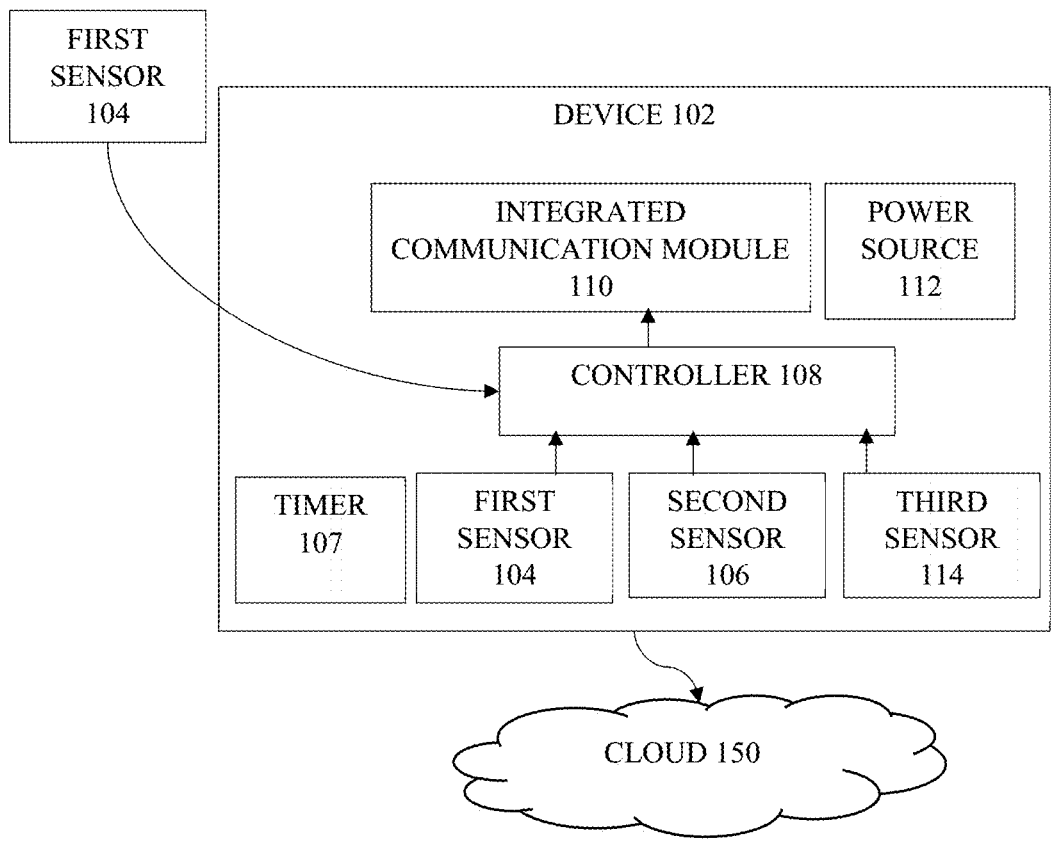
FIG. 1 illustrates a block diagram of a device for an early warning system for food safety violation, according to one or more embodiments.

In order to fully understand the scope of the invention, the following terms used herein are hereby defined.

For simplicity and clarity of illustration, the drawing figures illustrate the general manner of construction. Descriptions and details of well-known features and techniques may be omitted to avoid unnecessarily obscuring the present disclosure. The dimensions of some of the elements in the figures may be exaggerated relative to other elements to help improve understanding of embodiments of the present disclosure. The same reference numeral in different figures denotes the same elements.

The articles "a" and "an" are used herein refers to one or to more than one (i.e., to at least one) of the grammatical object of the article. By way of example, "an element" means one element or more than one element.

No element, act, or instruction used herein should be construed as critical or essential unless explicitly described as such. Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

The terms "first", "second", "third" and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include", "have", and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left", "right", "front", "back", "top", "bottom", "over", "under" and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The term "comprising", which is synonymous with "including", "containing", or "characterized by" here as used herein refers to being inclusive or open-ended, and does not exclude additional, unrecited elements or method steps, unless the context clearly requires otherwise.

As used herein, the term "component" is intended to be broadly construed as hardware, firmware, and/or a combination of hardware and software.

As used herein, the term "API" stands for Application Programming Interface. It is an interface that defines interactions between multiple software applications or mixed hardware-software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or designed based on an industry-standard to ensure interoperability. Through information hiding, APIs enable modularity, allowing users to use the interface independently of the implementation. Web APIs are now the most common meaning of the term API. There are also APIs for programming languages, software libraries, computer operating systems, and computer hardware.

As used herein, the term "IoT" stands for Internet of Things which describes the network of physical objects "things" or objects that are embedded with sensors, software, and other technologies for the purpose of connecting and exchanging data with other devices and systems over the internet.

As used herein "Machine learning" refers to algorithms that give a computer the ability to learn without being explicitly programmed including algorithms that learn from and make predictions about data. Machine learning algorithms include, but are not limited to, decision tree learning, artificial neural networks (ANN) (also referred to herein as a "neural net"), deep learning neural network, support vector machines, rules-based machine learning, random forest, etc. For the purposes of clarity, algorithms such as linear regression or logistic regression can be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming.

As used herein, the term "Dashboard" is a type of interface that visualizes particular Key Performance Indicators (KPIs) for a specific goal or process. It is based on data visualization and infographics.

As used herein, a "Database" is a collection of information that is organized so that it can be easily accessed, managed, and updated. Computer databases typically contain aggregations of data records or files.

As used herein, the term "Cloud" refers to servers that are accessed over the Internet, and the software and databases that run on those servers. Cloud servers are located in data centers all over the world. By using cloud computing, users and companies don't have to manage physical servers themselves or run software applications on their own machines.

Implementations may be realized in a computing system that includes a back-end component, e.g., as a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a local area network ("LAN") and a wide area network ("WAN"), e.g., the Intranet and Internet.

The computing system may include clients and servers. A client and server are generally remote from each other and typically interact through a communication network. The relationship of client and server arises by virtue of computer programs running on the respective computers and having a client-server relationship to each other.

Embodiments of the present invention may comprise or utilize a special purpose or general purpose computer including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described. Rather, the described features and acts are disclosed as example forms of implementing the claims.

Processors suitable for the execution of a computer program include, by way of example, both general and special purpose microprocessors, and any one or more processors of any appropriate kind of digital computer. Generally, a processor will receive instructions and data from a read-only memory or a random-access memory or both. Elements of a computer can include a processor for performing instructions and one or more memory devices for storing instructions and data. Generally, a computer will also include, or be operatively coupled to receive data, transfer data or both, to/from one or more mass storage devices for storing data e.g., magnetic disks, magneto optical disks, optical disks, or solid-state disks. However, a computer need not have such mass storage devices. Moreover, a computer may be embedded in another device, e.g., a mobile telephone, a personal digital assistant (PDA), a mobile audio player, a Global Positioning System (GPS) receiver, etc. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. The processor and the memory may be supplemented by, or incorporated in, special purpose logic circuitry.

To provide for interaction with a user, implementations may be realized on a computer having a display device (e.g., a CRT (cathode ray tube) or LCD (liquid crystal display) monitor) for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The term "device" as used herein refers to an electronic element that cannot be divided without destroying its stated function.

The term "communicatively coupled" as used herein refers to devices connected in a way that permits communication.

The term "configured" as used herein refers to arranged within the system to perform certain functions.

The term "sensor" as used herein refers to a transducer which converts a parameter at a test point to a form suitable for measurement by the test equipment. A transducer that converts a physical, biological, or chemical parameter into an electrical signal. A component providing a useful output in response to a physical, chemical, or biological phenomenon. This component may already have some signal conditioning associated with it. Examples: platinum resistance temperature detector, humidity sensor with voltage output, light sensor with frequency output, pH probe, and piezoresistive bridge.

The term "controller" as used herein refers to the component of a system that functions as the system controller. A controller typically sends program messages to and receives response messages from devices. A functional unit in a computer system that controls one or more units of the peripheral equipment. Synonym: peripheral control unit. See also: input-output controller; dual channel controller. In robotics, a processor that takes as input desired and measured position, velocity or other pertinent variables and whose output is a drive signal to a controlling motor or activator. A device through which one can introduce commands to a control system.

The term "integrated communication module" as used herein refers to the communications module encodes the message onto the network's physical medium representing a link to another system.

The term "power source" as used herein refers to the electrical and mechanical equipment and their interconnections necessary to generate or convert power.

The term "temperature recording" as used herein refers to the fluctuations of the temperature of the food as used herein through various spans of time.

The term "unique identification number" as used herein refers to a numeric or alphanumeric string that is associated with a single entity within a given system. A unique identification number makes it possible to address that entity, so that it can be accessed and interacted with. The unique identification number can be assigned to anything that needs to be distinguished from other entities, such as individual users, companies, machines, or websites. These distinctive values are usually assigned depending on the needs of the specific application but can either be randomly auto generated with an algorithm, allocated incrementally, or chosen by the user.

The term "non-contact" as used herein refers to a sensor that uses technology which doesn't come into physical contact.

The term "data" as used herein refers to the quantities, characters, or symbols on which operations are performed by a computer, which may be stored and transmitted in the form of electrical signals and recorded on magnetic, optical, or mechanical recording media. Here data refers to data of temperature, pressure humidity of food collected by the device with a timestamp.

The term "timer" as used herein refers to a register or storage location whose value is changed at regular intervals in such a manner as to measure time.

The term "clock" as used herein refers to a device that generates periodic signals used for synchronization. The device generates periodic, accurately spaced signals used for such purposes as timing, regulation of the operations of a processor, or generation of interrupts.

The term "sleep mode" as used herein refers to a power-saving mode of operation in which devices or parts of devices are switched off until needed.

The term "wake-up" as used herein refers to an event, or an interrupt generated to wake a device from sleep mode.

The term "timestamp" as used herein refers to a digital record of the time of occurrence of a particular event which has a record of time, date, day, week, month, and year.

The term "device agnostic" as used herein refers to in computing, a device or software program is said to be agnostic or data agnostic if the method or format of data transmission is irrelevant to the device or program's function. This means that the device or program can receive data in multiple formats or from multiple sources, and still process that data effectively.

The term "analytics module" as used herein refers to a module for processing the information resulting from the systematic analysis of data or statistics.

The term "anomaly" as used herein refers to an irregularity detected in the data. The data that deviates from what is standard, normal, or expected.

The term "alert" as used herein refers to a warning notification generated when an anomaly is detected in the data.

The term "failure in device" as used herein refers to improper working of the device or breakdown happening in the device.

The term "thermodynamic heat flow models" as used herein refers to heat transfer models that are applied to describe and quantify the heat transfer in the vicinity of the membrane, predict the temperatures on the membrane-bulk interface and temperature distribution in the food containers.

The term "improperly placed food containers" as used herein refers to misaligned arrangement of the food containers that result in false data readings.

The term "heating equipment" as used herein refers to any equipment designed, used, and intended to be used to supply heat for a structure.

The term "cooling equipment" as used herein refers to any equipment designed, used, and intended to be used to cool down a structure.

The term "water activity" used herein refers to the ratio between the vapor pressure of the food itself, when in a completely undisturbed balance with the surrounding air media, and the vapor pressure of distilled water under identical conditions. A water activity of 0.80 means the vapor pressure is 80 percent of that of pure water. The water activity increases with temperature. The moisture condition of a product can be measured as the equilibrium relative humidity (ERH) expressed in percentage or as the water activity expressed as a decimal.

The term "receiving" as used herein refers to being given information.

The term "generating" as used herein refers to creating information.

The term "memory" as used herein refers to any device in which information can be stored.

The term "execute" as used herein refers to run or launch.

The term "instructions" as used herein refers to a software program or machine executable code.

The term "processor" as used herein refers to a component in the server for executing instructions stored in memory.

Example embodiments, as described below, may be used to provide event planning and management. It will be appreciated that the various embodiments discussed herein need not necessarily belong to the same group of embodiments and may be grouped into various other embodiments not explicitly disclosed herein. In the following description, for purposes of explanation, numerous specific details are set forth in order to provide a thorough understanding of the various embodiments.

Implementations and all of the functional operations described in this specification may be realized in digital electronic circuitry, or in computer software, firmware, or hardware.

A software program (also known as a program, software, executable code, or instructions) may be written in any appropriate form of programming language, including compiled or interpreted languages, and it may be deployed in any appropriate form, including as a standalone program or as a module, component, subroutine, or other unit suitable for use in a computing environment.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed such as the acts recited in the embodiments.

In an aspect, the present disclosure discloses a device comprising first sensors; a timer; a controller; an integrated communication module; a power source, wherein the device is for temperature recording.

In an embodiment of the device, the device is an internet of things device for temperature recording.

In an embodiment of the device, the device is assigned and tracked through a unique identification number.

In an embodiment of the device, wherein the first sensor is a non-contact sensor.

In an embodiment of the device, the device is configured to collect data and send it to a system to perform predictive analytics.

In an embodiment of the device, the device is configured to collect data of exposed food.

In an embodiment of the device, the device further comprises a second sensor to measure one or more of humidity and pressure.

In an embodiment of the device, the controller is configured to: receive data from the first sensor; receive data from the second sensor; and send the data to a cloud through the integrated communication module.

In an embodiment of the device, the integrated communication module is a Wi-Fi® trans-receiver.

FIG. 1 illustrates a block diagram of a device 102 for an early warning system for food safety violation, according to one or more embodiments. The device 102 comprises a plurality of first sensors 104; a second sensor 106; a timer, 107, a controller 108; an integrated communication module 110; a power source 112. The device 102 is for temperature recording. The device 102 is configured to record data of exposed food. The food may be kept in a restaurant, vending place, food truck, food counter. The term food construed herein may refer to perishable consumables. The data comprises data of temperature, humidity, and pressure of the exposed food.

According to the U.S. food safety standards defined by the Food and Drug Administration (FDA), hot foods should be kept at an internal temperature of 140° F. or warmer. A food warmer or the heating equipment in the food container must have the capability to keep foods at 140° F. or warmer. This is the temperature required to keep bacteria at bay. Some restaurants may prefer to keep the food at 160° F. Foods that may be refrigerated for serving later but should be thoroughly reheated to 165° F. before serving. Cold foods should be kept at 40° F. or colder. Cold foods must be refrigerated until serving time. If food is going to stay out on the buffet table longer than 2 hours, place plates of cold food on ice to retain the chill. Any perishables left out at room temperature for more than 2 hours must be discarded unless the perishables are kept hot or cold. If the buffet is held in a place where the temperature is above 90° F., the safe holding time is reduced to 1 hour. Most foods have a water activity above 0.95 and that will provide sufficient moisture to support the growth of bacteria, yeasts, and mold. The amount of available moisture can be reduced to a point which will inhibit the growth of the organisms. If the water activity of food is controlled to 0.85 or less in the finished product, it is not subject to the FDA regulations of 21 CFR Parts 108, 113, and 114.

The device 102 is an internet of things device. The device 102 is configured to send the data measured to a cloud storage. The data is collected and stored in the cloud storage, wherein the cloud storage comprises a secure and scalable database to perform predictive analytics. There may be a plurality of devices 102 for measuring and sending the data to the cloud storage. Each of the devices 102 is assigned a unique identification number. The device is tracked by its unique identification number.

In an embodiment of the device, the first sensor comprises a low voltage temperature sensor.

In an embodiment of the device, the low voltage temperature sensor is configured for measuring hot temperature.

In an embodiment of the device, the first sensor comprises one of a: high precision infrared array sensor and an infrared camera.

In an embodiment of the device, the first sensor comprises Micro-Electro-Mechanical Systems (MEMS) sensor.

In an embodiment of the device, the first sensor is configured for measuring cold temperature.

In an embodiment of the device, the first sensor 104 comprises temperature sensors to measure the temperature. The first sensor 104 are non-contact sensors. The first sensor 104 are configured by the controller to measure temperature at regular intervals of time and send the data of temperature to the controller 108. The first sensor 104 comprises a low voltage temperature sensor. In an example the low voltage temperature sensor is capable of monitoring in the range of −55° C. to 125° C. with an accuracy of 0.5° C. The first sensor 104 may be configured to measure hot temperatures.

In an embodiment of the device, the first sensor 104 comprises a high precision infrared array sensor, and an infrared camera. The first sensor 104 used herein may be Micro-Electro-Mechanical Systems (MEMS) sensors configured to measure cold temperature.

In an embodiment of the device, the second sensor keeps a record of time to put the device in a sleep mode.

In an embodiment of the device, the device is configured to go in sleep mode and wake-up at certain time intervals for collecting data.

In an embodiment of the device the device 102 comprises a timer 107. The timer 107 keeps a record of time to put the device in a sleep mode. The controller 108 is configured to receive data in the form of time from the timer 107. The time received may be in nanoseconds, microseconds, milliseconds, seconds or in minutes. The timer 107 is configured by the controller 108 to keep a record of time and put the device 102 to sleep when not in use. The device 102 may wake-up according to the time set in the timer 107 to measure the data. The controller 108 is configured to put the device 102 in sleep mode. The controller 108 is configured to wake-up the device 102 at certain time intervals according to the time set in the timer 107. The sleep mode and wake-up mode in the device 102 reduces the power consumption of the device by 90%.

As an example, the controller 108 configures the time in the timer 107 to wake-up the device 102 every 15 minutes. Therefore, the device 102 may wake-up every 15 minutes to collect the data and again go into sleep mode for the next 15 minutes.

In an embodiment, the device further comprises a second sensor to measure one or more of humidity and pressure. The controller 108 is configured to receive data from the first sensors 104 and second sensor 106. The temperature data is received from the first sensors 104. The controller may also receive data of humidity and pressure from the second sensor 106. The controller 108 is further configured to send the data to the cloud through the integrated communication module 110. The integrated communication module 110 may comprise a Wi-Fi® trans-receiver. The data received by the controller 108 may comprise a timestamp including a time, a day, a week, a year, a holiday, weather data, point of sale data. The data is used to keep a record of the time, day, week, year, holiday, weather in order to keep a history of the data and learn through the data that is received in the cloud. The data may be compared with a pre-set data in the cloud to predict the anomaly in the data and raise an alert if an anomaly is detected.

In an embodiment of the device, the power source comprises at least one of a battery and an USB cable.

In an embodiment of the device, the device comprises a third sensor.

In an embodiment of the device, the third sensor comprises a voltage sensor to measure the voltage of the power source in case the power source comprises a battery.

In an embodiment of the device, the data comprises: timestamp including a time, a day, a week, a year, a holiday, weather data, point of sale data.

In an embodiment, the device 102 is powered by the power source 112. The power source 112 comprises at least one of a battery, and an USB cable. In case the power source 112 being a battery, the device 102 comprises a third sensor 114. The third sensor 114 comprises a voltage sensor to measure the voltage of the power source 112. The third sensor 114 may be configured by the controller to collect data of the voltage of the battery and send the data to the controller 108. The controller 108 is further configured to send the data to the cloud through the integrated communication module 110. The data of the voltage may be used to detect and predict the time to replace the battery in the device 102, when the data of the battery is lower than a pre-set value set for the voltage.

In an embodiment of the device, the device is accessed through a web portal or an application programming interface from a cloud for predictive analytics.

In an embodiment of the device, the device is controlled through a web portal or an application programming interface for predictive analytics.

In an embodiment of the device, the control of the device is device agnostic.

In an embodiment of the device, the predictive analytics is performed through artificial intelligence and machine learning techniques.

In an embodiment of the device, the artificial intelligence and machine learning techniques are embedded in a cloud.

In an embodiment, the device 102 is controlled through a web portal or an application programming interface for predictive analytics. The control of the device 102 is device agnostic. Also, the device 102 is accessed through a web portal or an application programming interface from a cloud for predictive analytics. The data received by the cloud is continuously compared for a fluctuation in the data with a pre-set value. The data is compared for detecting the anomaly in the data. The pre-set values may comprise values of temperature, humidity, pressure, and voltage. If there is a constant rise, drop or fluctuation in the data the anomaly is detected using predictive analytics. If the temperature of a hot food drops below 140° F., the temperature of cold food is above 40° F. or the water activity is above 0.85, the battery voltage is below 2.5 V then an anomaly in the data is detected. The predictive analytics is performed through artificial intelligence and machine learning techniques. The artificial intelligence and machine learning techniques are embedded in a cloud. As an example, the pre-set temperature for hot food is above 150° F., the data received from the first sensor 104 is 145° F. for about 10 minutes, then an anomaly is detected that the food safety standards are not matched, and an alert is generated through the web portal or the application programming interface. If there is a constant increase or decrease in the temperature data received, then the data may point to an anomaly in a heating equipment or cooling equipment. If there is a sudden change in the temperature that may refer to food being misplaced by the predictive analytics. If there is constant decrease in the voltage of the battery, there may be an alert for replacing the battery of the device 102.

As an example, the data received from a hot food container is 137° F. and the water activity has risen to 0.87, the anomaly in the data of temperature as well as pressure and humidity is predicted. The temperature of the food is not remaining constant even when a heating equipment is maintaining the temperature of the hot food container, there will be a constant increase or decrease in the received temperature, may be 140.5° F., 140.10° F., 140.20° F. with passage of time. This gradual increase of data may refer to anomaly in the heating equipment.

Figure 2:
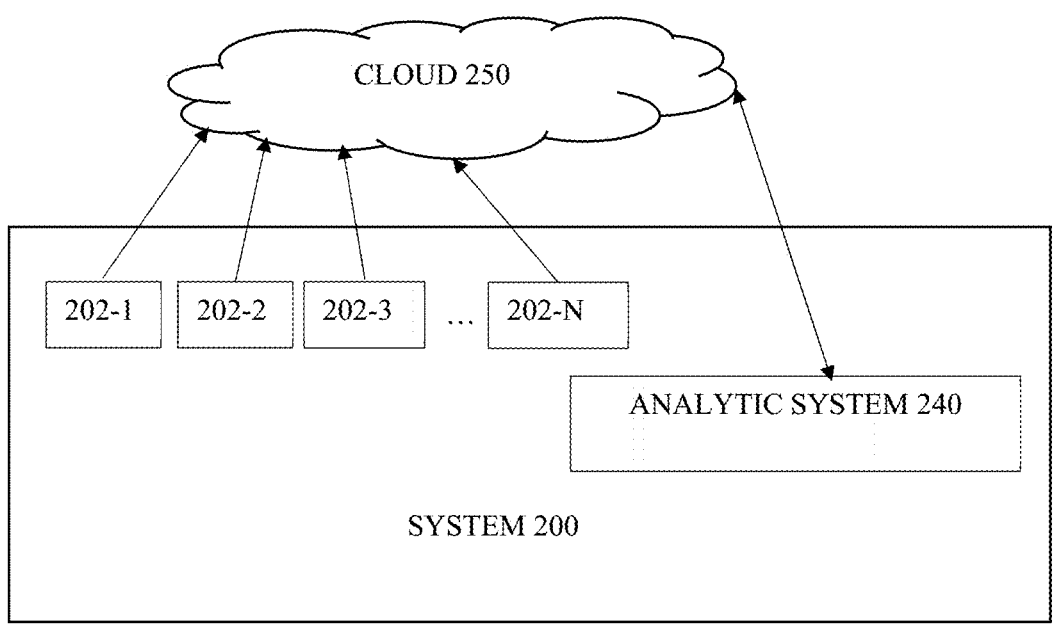
FIG. 2 illustrates a network implementation of the early warning system for food safety violation, according to one or more embodiments

FIG. 2 shows a network implementation of an early warning system 200 for food safety violation, in accordance with an embodiment of the present subject matter may be described. The system 200 may comprise an analytic system 240 and a device for temperature recording 202-1 to 202-N.

In one example, the analytic system 240 may be connected to the devices 202-1 to 202-N through a cloud 250.

It should be understood that the early warning system 200, cloud 250, the analytic system 240 and the device 202 correspond to computing devices. It may be understood that the cloud 250 may be a network server. The cloud 250 may comprise a web server, web application server and a server database. It may be understood that the system 200 may also be implemented in a variety of computing systems, such as a laptop computer, a desktop computer, a notebook, a workstation, a mainframe computer, a cloud-based computing environment, or a smartphone and the like.

The device 202-1 to 202-N may be configured to measure the data and send it to the system 200 through the cloud 250.

In an embodiment of the system, the invention discloses a system comprising: a device for temperature recording; an integrated communication module; a memory; a processor coupled with the memory. The processor is configured to: receive data from the device; analyze the data through an analytics module; predict an anomaly in the data through the analytics module; generate an alert for ensuring quality of food and safety of the food; and predict a failure in the device.

In an embodiment, the device is communicatively coupled with the processor through the integrated communication module.

Figure 3:
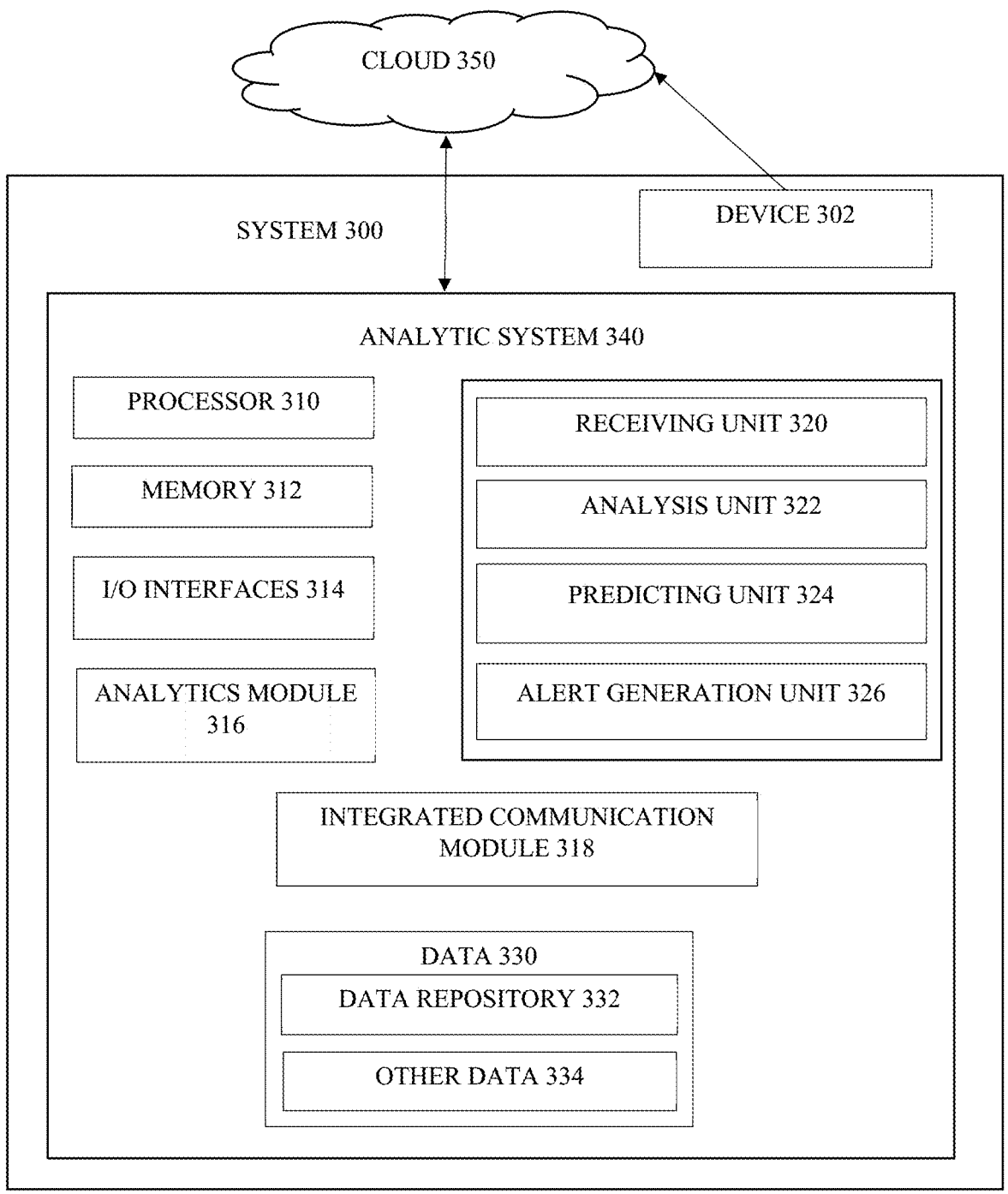
FIG. 3 illustrates a block diagram of the early warning system for food safety violation, according to one or more embodiments

FIG. 3 illustrates a block diagram of the early warning system 300 for food safety violation, according to one or more embodiments. The system 300 disclosed herein comprises a device for temperature recording and an analytic system 340. The device for temperature recording 302 and the analytic system 340 may communicate through a cloud 350. The analytic system 340 further comprises a memory 312, a processor 310, input/output (I/O) interfaces 314, an analytics module 316 and an integrated communication module 318. The processor 310 is communicatively coupled to the memory 312, input/output (I/O) interfaces 314, the analytics module 316 and the integrated communication module 318. The analytic system 340 also comprises data 330. The processor 310 may take the form of a single core processor, multi-core processor (e.g., a dual core processor, triple core processor, quad core processor, etc.), microprocessor, etc. In some embodiments, the processor 310 may be external to an apparatus (e.g., server), for example the processor 310 may be a remote processor (e.g., a cloud-based processor). Alternatively, or additionally, the processor 310 may be internal and/or local to the apparatus. The analytics module 316 may utilize a statistical analysis, a machine learning technique, and artificial intelligence. The artificial intelligence and machine learning techniques may be embedded in a cloud The analytic system 340 further comprises a receiving unit 320, an analysis unit 322, a predicting unit 324, and an alert generation unit 326.

The data 330 may include a repository 332 for storing data processed, computed, received, and generated by one or more of the units. Furthermore, the data 330 may include other data 334 for storing data generated as a result of the execution of units and modules other than the ones mentioned above.

The above-mentioned units in association with the processor 310 are configured to perform the early warning system for food safety violation.

In an embodiment of the system, the device is assigned a unique identification number.

In an embodiment of the system, the device is tracked through the unique identification number.

In an embodiment of the system, the data comprises temperature, humidity, pressure, time, and voltage data.

In an embodiment of the system, the data comprises: timestamp including a time, a day, a week, a year, a holiday, weather data, point of sale data.

In an embodiment of the system, the integrated communication module is a Wi-Fi® trans-receiver.

In an embodiment of the system, the data is received from the device through a cloud.

In an embodiment of the system, the system continuously compares a fluctuation in the data with a pre-set value for detecting the anomaly in the data.

In an embodiment of the system, the pre-set value comprises pre-set values of temperature, humidity, pressure, time, and voltage.

In an embodiment of the system, wherein the pre-set value is according to food safety standards.

In an embodiment, the system 300 comprises a plurality of devices 102 communicatively coupled to the analytic system through a cloud. The integrated communication module 318 comprises a Wi-Fi® trans-receiver. The device 302 measures data of exposed food. The device 302 measures and sends data to the cloud through the integrated communication module 318. The device 302 are assigned a unique identification number. The device 302 are tracked through its unique identification number. The unique identification number makes it convenient for a user to track the device and analyze the data of each of the devices.

The device 302 may collect the data of temperature, humidity, and pressure of exposed food. The device may also collect the data of voltage in case the power source is a battery. The device 302 may send the data collected to a cloud 350. The processor 310 is configured to receive the data through the integrated communication module 318 from the cloud 350. The data is received from the device 302 through the cloud 350. The data received comprises temperature, humidity, pressure, time, and voltage data. The data received includes timestamp including a time, a day, a week, a year, a holiday, weather data, point of sale data.

In an embodiment of the system, the system continuously monitors the data for detecting the anomaly in the data.

In an embodiment of the system, the system reports a warning when the anomaly in the data is detected.

In an embodiment of the system, the alert is generated when the anomaly in the data is detected.

In an embodiment of the system, the alert is one of a notification, message, and an email.

In an embodiment of the system, an analytics module analyses the data and predicts the anomaly in the data, using artificial intelligence and machine learning techniques.

In an embodiment of the system, the analytics module predicts the failure in the device, using artificial intelligence and machine learning techniques.

In an embodiment of the system, an analyzed data is displayed on a dashboard for interaction with a user.

In an embodiment of the system, the analytics module analyses temperature data, using thermodynamic heat flow models to predict an actual food temperature in order to improve quality of food and safety of the food.

In an embodiment of the system, in case of anomaly detected in the data, the processor is configured to automatically control a heating equipment and a cooling equipment to maintain a pre-set temperature.

In an embodiment, the analytics module predicts time to replace food based upon analysis of the data.

In an embodiment, the analytics module detects improperly placed food containers.

In an embodiment, the processor is configured to send an alert for improperly placed food containers.

In an embodiment, the alert is one of a notification, message, and an email.

In an embodiment, the analytics module is configured to diagnose a problem in one or more first sensors, one or more second sensors, a power source, the integrated communication module, a heating equipment, and a cooling equipment.

In an embodiment, the analytics module is configured to diagnose a problem by analyzing a pattern of change in the data.

In an embodiment, the pattern of change in the data is a gradual increase or decrease and a constant fluctuation in the data over a period of time.

In an embodiment, the analytics module is configured to predict failure in the device and a heating and cooling equipment failure.

In an embodiment, the system fails to receive the data in case of failure in the device, the heating equipment failure, and the cooling equipment failure.

In an embodiment, the analytics module is configured to predict a time to replace a sensor battery based upon analysis of voltage data.

In an embodiment, the analytics module is configured to schedule a maintenance of the device, the heating equipment and the cooling equipment based upon the analysis of the data.

The processor 310 is configured to analyze the data in the analysis unit 322 using predictive analytics through the analytics module 316. The data is analyzed for increase, decrease, fluctuation in the data. A pattern in the data received is analyzed. The pattern of the data received trains the analytics module 316 to perform predictive analysis.

In an embodiment, the predictive analysis is done through an analytics module using machine learning techniques and artificial intelligence.

The processor 310 continuously compares a fluctuation in the data with a pre-set value for detecting anomaly in the data. The pre-set value comprises pre-set values of temperature, humidity, pressure, time, and voltage. The pre-set value is according to food safety standards.

According to the U.S. food safety standards defined by the Food and Drug Administration (FDA), hot foods should be kept at an internal temperature of 140° F. or warmer. A food warmer or the heating equipment in the food container must have the capability to keep foods at 160° F. or warmer. Some of restaurants for example Subway® prefer to keep the food at 160° F. This is the temperature required to keep bacteria at bay. Foods that may be refrigerated for serving later but should be thoroughly reheated to 165° F. before serving. Cold foods should be kept at 40° F. or colder. Cold foods must be refrigerated until serving time. If food is going to stay out on the buffet table longer than 2 hours, place plates of cold food on ice to retain the chill. Any perishables left out at room temperature for more than 2 hours must be discarded unless the perishables are kept hot or cold. If the buffet is held in a place where the temperature is above 90° F., the safe holding time is reduced to 1 hour. Most foods have a water activity above 0.95 and that will provide sufficient moisture to support the growth of bacteria, yeasts, and mold. The amount of available moisture can be reduced to a point which will inhibit the growth of the organisms. If the water activity of food is controlled to 0.85 or less in the finished product, it is not subject to the FDA regulations of 21 CFR Parts 108, 113, and 114.

The analytics module 316 analyses temperature data, using thermodynamic heat flow models to predict an actual food temperature in order to improve quality of food and safety of the food. The analytics module 316 analyses the data and predicts the anomaly in the data, using predictive analysis. The predictive analysis is done using artificial intelligence and machine learning techniques. The artificial intelligence and machine learning technique is embedded in the cloud.

In an embodiment, an analyzed data is displayed on the dashboard for interaction with a user. The dashboard allows food establishment owners and other personnel (further referred as users) to access and review data of each device 302. The analytics derived from the dashboard enables users to make decisions related to temperature controls. The temperature of the heating equipment and the cooling equipment may be adjusted according to the analysis of the data. Further, the dashboard also displays a result of the prediction of the requirement of maintenance and replacement of the heating equipment and the cooling equipment. The dashboard allows for simultaneous monitoring of devices located in multiple establishments under a common ownership or management and is designed to add as many stores or locations as necessary.

In an embodiment, the analytics module 316 is configured to predict an anomaly in the data by analyzing a pattern of change in the data. The pattern of change in the data is a gradual increase or decrease and a constant fluctuation in the data over a period of time. As an example, the data analyzed shows 40° C. temperature for the hot food for a device 302. The pre-set value of hot temperature is 50° C. Then the analytics module 316 predicts the anomaly in the data and the heating equipment.

In an embodiment, in case of anomaly detected in the data, the processor is configured to automatically control a heating equipment and a cooling equipment to maintain a pre-set temperature. The analytics module 316 may predict the anomaly in the heating equipment, cooling equipment and the device 302 according to the analysis of the data. In case of anomaly in the heating equipment, and the cooling equipment the analysis of the data received may show a gradual decrease or an increase in the data. The analytics module 316 may also predict time for scheduling maintenance of the device, the heating equipment, and the cooling equipment according to the analysis of the data. The analytic system 340 may fail to receive the data in case of failure in the device, the heating equipment failure, and the cooling equipment failure or the analyzed data may be haphazard with random values. In such a case of failure to receive data, the analytics module 316 is configured to predict failure in the device and a heating and cooling equipment. The analytics module 316 predicts the failure in the device, using artificial intelligence and machine learning techniques.

If in case the analysis of the data shows sudden change in the data, the analytics module 316 may predict improperly placed food containers. The processor 310 is configured to send an alert for improperly placed food containers to the users. The alert is one of a notification, message, and an email. The analytics module predicts time to replace the food according to the analysis of the timestamp of the data received.

In an embodiment, the processor 310 is configured to generate a warning and alert through the alert generation unit 326 in case of an anomaly in the data predicted. The alert is one of a notification, message, and an email. The alert is sent to the user to take corrective action to maintain the temperature; replace the heating equipment, cooling equipment or the one or more device; schedule maintenance of the heating equipment, cooling equipment or the one or more device.

In an embodiment, the analytics module is configured to predict a time to replace a battery based upon analysis of voltage data. The analyzed data of voltage may be decreasing that predicts the time to the battery of the device.

Figure 4:
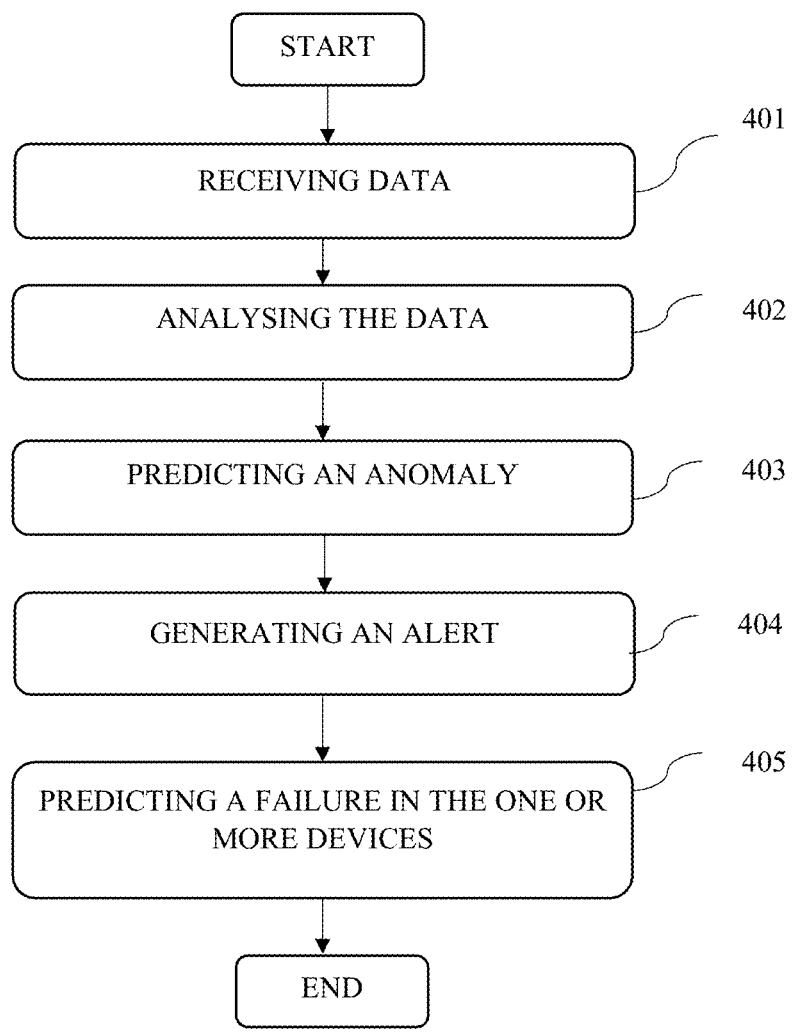
FIG. 4 illustrates a method for early warning for food safety violation, according to one or more embodiments

FIG. 4 illustrates a method for early warning for food safety violations.

An embodiment relates to a method for temperature recording comprising: receiving data; analyzing the data through an analytics module; predicting an anomaly in the data through the analytics module; generating an alert for ensuring quality of food and safety of the food; and predicting a failure in the device.

In an embodiment of the method, the method comprises: assigning a unique identification number to the device.

In an embodiment of the method, the method comprises tracking the device through the unique identification number.

In an embodiment of the method, the data comprises a temperature, a humidity, a pressure, time, and voltage.

In an embodiment of the method, the data comprises: timestamp including a time, a day, a week, a year, a holiday, weather data, point of sale data.

In an embodiment of the method, the receiving of the data is from the device through a cloud.

In an embodiment of the method, the method comprises comparing the data continuously with a pre-set value for fluctuations in a value of the data for detecting the anomaly in the data.

In an embodiment of the method, the pre-set value comprises pre-set values of: a temperature, a humidity, a pressure, time, and voltage.

In an embodiment of the method, the pre-set value is according to a food safety standard.

In an embodiment of the method, the data is continuously monitored for detecting the anomaly in the data.

In an embodiment of the method, a warning is reported when an anomaly is detected.

In an embodiment of the method, the alert is generated when an anomaly is detected.

In an embodiment of the method, the alert is one of a notification, message, and an email.

In an embodiment of the method, analyzing the data and predicting the anomaly in the data is done through the analytics module using predictive analytics.

In an embodiment of the method, predicting the failure in the device is done through the analytics module using predictive analytics.

In an embodiment of the method, the predictive analytics is performed through artificial intelligence and machine learning technique.

In an embodiment of the method, the artificial intelligence and machine learning techniques are embedded in a cloud.

In an embodiment of the method, the method comprises displaying an analyzed data on a dashboard for interaction with a user.

In an embodiment of the method, the method comprises analyzing the data using thermodynamic heat flow models for predicting an actual food temperature in order to improve the quality of the food and the safety of the food.

In an embodiment of the method, the method comprises controlling a heating equipment and a cooling equipment automatically to maintain a pre-set temperature when the anomaly in the data is detected.

In an embodiment of the method, the method comprises predicting a time to replace the food based upon analysis of the data by the analytics module.

In an embodiment of the method, the method comprises detecting improperly placed food containers by analyzing the data by the analytics module.

In an embodiment of the method, the method comprises sending an alert to a user for improperly placed food containers.

In an embodiment of the method, the alert is one of a notification, message, and an email.

In an embodiment of the method, the method comprises diagnosing a problem in the device and the heating equipment and the cooling equipment. In an embodiment of the method, the method comprises diagnosing the problem by analyzing a pattern of change in the data.

In an embodiment of the method, the pattern of change in the data is a gradual increase, decrease and a constant fluctuation in the data over a period.

In an embodiment of the method, the method comprises predicting failure in the device, the heating equipment, and the cooling equipment through the analytics module.

In an embodiment of the method, the method comprises failing to receive the data in case of failure in the device, the heating equipment, and the cooling equipment.

In an embodiment of the method, the method comprises predicting a time to replace a sensor battery based upon the analyzing of a voltage data.

In an embodiment of the method, the method comprises scheduling maintenance of the device, the heating equipment, and the cooling equipment.

At step 401, the method comprises receiving data by the analytic system through the cloud. The data may be sent by a device for temperature recording to the cloud. The data received comprises temperature, humidity, pressure, time, and voltage data. The data received includes timestamp including a time, a day, a week, a year, a holiday, weather data, point of sale data.

In an embodiment of the method, the method comprises assigning a unique identification number to each of the devices. The unique identification number makes it easy to keep a track on each of the devices and the data sent by each of the devices.

At step 402, the data is analyzed using predictive analytics. The data is analyzed for increase, decrease, fluctuation in the data. A pattern in the data received is analyzed. The pattern in the data may be a gradual increase in the data, gradual decrease in the data, receiving haphazard values of the data, failing to receive the data. The data is continuously compared with a pre-set value for detecting the anomaly in the data. The pre-set value comprises pre-set values of temperature, humidity, pressure, time, and voltage. The pre-set value is according to food safety standards. The temperature data is analyzed using thermodynamic heat flow models to predict an actual food temperature in order to improve quality of food and safety of the food. The data is analyzed to predict an anomaly in the data. Predictive analytics is used to detect an anomaly in the data. The predictive analysis is done using artificial intelligence and machine learning technique. The artificial intelligence and machine learning technique is embedded in the cloud.

At step 403, an anomaly in the data is predicted based upon the analysis of the data. The pattern of change in the data is used to predict anomaly in the data. The pattern of change in the data is a gradual increase in the data, a gradual decrease in the data, a constant fluctuation in the data over a period, and failing to receive the data. the anomaly in a heating equipment, a cooling equipment and the device may be predicted according to the analysis of the data.

In an embodiment of the method, anomaly in the heating equipment, and the cooling equipment the analysis of the data received may show a gradual decrease or an increase in the data. The users may control the heating equipment, cooling equipment and the device to rectify the anomaly in the data.

In an embodiment of the method, a time for scheduling maintenance of the device, the heating equipment, and the cooling equipment is predicted. Time to replace the food is also predicted according to the analysis of the timestamp of the data received. If in case the analysis of the data shows sudden change in the data, the system may predict that the food containers are improperly placed.

In an embodiment of the method, a time to replace a battery is predicted based upon analysis of voltage data. The analyzed data of voltage may be decreasing that predicts the time to replace or charge the battery of the device.

At step 404, an alert is sent to the users if an anomaly is predicted in the data. An alert is one of a notification, message, and an email. In case of improperly placed food containers or time to replace the food, the alert is sent to the users. The alert is sent to the users to take corrective action to maintain the temperature; replace the heating equipment, cooling equipment or the one or more device; schedule maintenance of the heating equipment, cooling equipment or the one or more device, replace the food, place the food containers properly, replace or charge the battery.

At step 405, a failure in the device and a heating and cooling equipment is predicted.

In an embodiment of the method, the device and a heating and cooling equipment failure is predicted if the system fails to receive the data, or the analyzed data may be haphazard with random values. The failure in the device is predicted using artificial intelligence and machine learning techniques.

Figure 5:
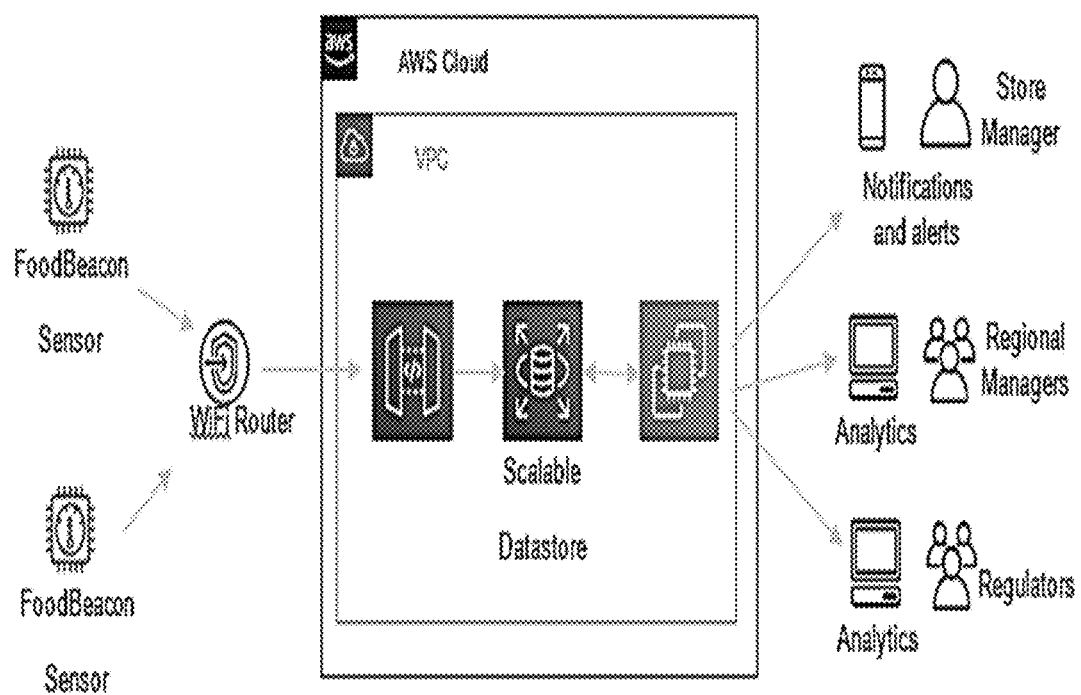
FIG. 5 illustrates an example of the early warning system for food safety violation, according to one or more embodiments

FIG. 5 illustrates an example of the early warning system for food safety violation, according to one or more embodiments. A sensor in the device may measure data of the temperature, humidity, and pressure of the exposed food. The data measured may be sent to a cloud through an integrated communication module shown as the Wi-Fi® Router. The cloud may be a scalable database storage. The cloud may be an Amazon web Service (AWS) cloud. The data in the cloud may be available for analysis. The system does a predictive analysis of the data in the cloud using artificial intelligence and machine learning techniques. The system may predict the anomaly in the data. According to the anomaly in the data, an alert is generated to notify the users that manage the system. The users may control the heating equipment, cooling equipment and the device to rectify the anomaly in the data. In an embodiment, the system may predict the anomaly in the heating equipment, cooling equipment and the device based upon the analysis of the data. In an embodiment, the system may predict time for scheduling maintenance of the heating equipment, cooling equipment and the device. The system may predict a failure in the heating equipment, cooling equipment and the device. The system may predict time to replace the food containers based upon the analysis. The system may predict the improperly placed containers based upon the analysis. The system may also predict time to replace the battery in the device according to the analysis of the data.

Figure 6:
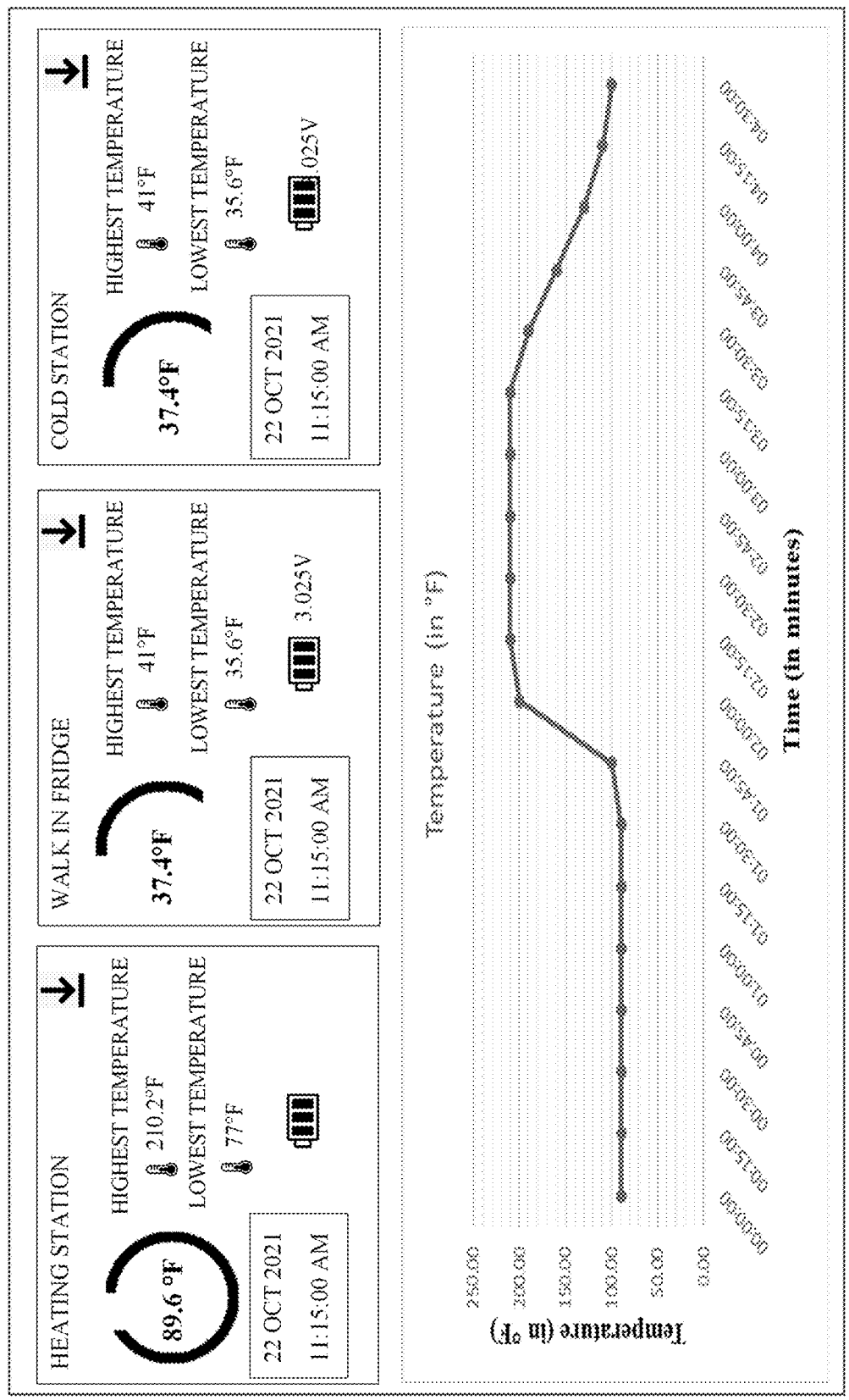
FIG. 6 illustrates an example of a dashboard of the early warning system for food safety violation, according to one or more embodiments

FIG. 6 illustrates an example of a dashboard of the early warning system for food safety violation, according to one or more embodiments. FIG. 6 shows the dashboard showing a sample graph with dots in the rising and falling slope of the graph indicating food holdings at the desired temperature and dots on the plateau of the graph indicating undesired temperature of food. Thus, raising an alert for food safety violations. The dashboards also show the temperature readings of the food containers collected by the device.

Foregoing disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules, units may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software (e.g., embodied in a non-transitory machine-readable medium), or any combination of hardware, firmware, and software. For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

INCORPORATION BY REFERENCE

All publications, patents, and patent applications cited in this specification are hereby incorporated by reference in their entirety, including:
U.S. Publication Number US20170365157A1 titled "Apparatus and methods for hygiene monitoring in restaurants and grocery superstores."
U.S. Publication Number KR102116613B1 titled "Food thermometer having LoRa communication function and remote managing system using this."

U.S. Publication Number US20180224150A1 titled "System for monitoring an open container."
U.S. Publication Number WO2019218017A1 titled "A device for electronically measuring temperature of a food item at predetermined milestones."
U.S. Pat. No. 4,989,990A titled "Method and arrangement for measuring a temperature state of open container bodies."
U.S. Pat. No. 9,927,304B2 titled "Apparatus and method for determining core temperature of food."

What is claimed is:

1. A device, comprising:
a first sensor;
a timer;
a controller;
an integrated communication module;
a power source; and
wherein the device is for temperature measuring; and
wherein the device collects data of food automatically at regular time intervals and sends the data to a cloud through the integrated communication module to perform predictive analytics;
and wherein the device is controlled through a web portal or an application programming interface, and wherein the device receives data in multiple data formats and the controller is configured to process the data in the multiple data formats before sending the data to the cloud.

2. The device of claim 1, wherein the device is an internet of things device for the temperature measuring.

3. The device of claim 1, wherein the device is assigned a unique identification number; and wherein the device is tracked through the unique identification number.

4. The device of claim 1, wherein the first sensor is a non-contact temperature sensor.

5. The device of claim 1, wherein the data comprises:
a temperature value, a humidity value, a pressure value, a time-stamp, and a voltage value;
and wherein the time-stamp comprises a time, a day, a month, a year, and a holiday.

6. The device of claim 1 wherein the timer keeps a record of time to put the device in a sleep mode; and wherein the device goes in sleep mode and wakes up at certain time intervals for collecting data.

7. The device of claim 1, wherein the device further comprises a second sensor for measuring:
a humidity, and a pressure.

8. The device of claim 1, wherein the device comprises a third sensor comprising a voltage sensor for measuring voltage of the power source, in case the power source comprises a battery.

9. The device of claim 1, wherein the first sensor comprises one of a: high precision infrared array sensor and an infrared camera for sensing hot temperature, and a Micro-Electro-Mechanical Systems (MEMS) sensor for sensing cold temperature.

10. The device of claim 1, wherein the device is accessed through the web portal or the application programming interface from the cloud for the predictive analytics.

11. A system comprising:
a sensor for temperature measuring;
an integrated communication module; and
an analytic system; wherein the analytic system further comprising:
a memory;
a processor coupled with the memory, wherein the processor is configured to:
receive data from a cloud;
analyze the data through an analytics module using predictive analytics;
predict an anomaly in the data through the analytics module using the predictive analytics;
generate an alert in case of the anomaly detected; and
predict a possibility of failure in the sensor; and
wherein the sensor automatically collects data of food at regular time intervals and sends the data to the cloud through the integrated communication module to perform the predictive analytics;
wherein the analytics module predicts the anomaly in the data by analyzing a pattern of change in the data through the predictive analytics;
wherein the predictive analytics is performed through an artificial intelligence and a machine learning technique by adjusting a classifier and the system learns through a history of the data received in the cloud to perform the predictive analytics; and
wherein a thermodynamic heat flow model is used by the analytics module to analyze food temperature; and
wherein the system is configured to maintain the data of food within a pre-set range according to a food safety standard.

12. The system of claim 11, wherein the system comprises a plurality of sensors communicatively coupled to the analytic system through the cloud.

13. The system of claim 11, wherein the data is received from the sensor through the cloud; and
wherein the data comprises:
a temperature value, a humidity value, a pressure value, a time-stamp, and a voltage value; and
wherein the time-stamp comprises a time, a day, a month, a year, and a holiday and the data is used for keeping a record of the time, the day, week, year, holiday, weather for keeping the history of the data.

14. The system of claim 11, wherein the system compares a fluctuation in the data with a pre-set range of the data for detecting the anomaly in the data to maintain a food safety parameter within the pre-set range of the data and for predicting the possibility of failure in the sensor, a heating equipment and a cooling equipment using predictive analytics; and
wherein the food safety parameter comprises a temperature value, a humidity value, and a pressure value; and
wherein the anomaly in the data comprises the fluctuation in the data that does not match with the pre-set range of the data in the system.

15. The system of claim 14, wherein the alert is generated when the anomaly is detected.

16. The system of claim 14, wherein the artificial intelligence and the machine learning technique are embedded in the cloud.

17. The system of claim 11, wherein the analytics module is operable to learn and predict the anomaly from the pattern of change in the data, and wherein the pattern of change in the data is one of a gradual increase, a gradual decrease, and a continuous fluctuation over a period of time in the data.

18. The system of claim 11, wherein the processor predicts a time to replace the food by analyzing a time-stamp of the data received.

19. The system of claim 11, wherein the processor is operable to send the alert to a user for improperly placed food containers in case the anomaly detected is due to sudden change in the data received.

20. The system of claim 11, wherein the processor is operable to predict a time to replace a sensor battery in case the anomaly detected is due to decrease in a voltage value, based upon analysis of the voltage value received by the system.

21. A method comprising the steps of:
receiving data through a cloud;
analyzing the data through an analytics module using predictive analytics;
predicting an anomaly in the data through the analytics module using the predictive analytics;
generating an alert in case the anomaly is detected; and
predicting possibility of a failure in a sensor; and
wherein the method is operable to maintain a food safety parameter within a pre-set range of the data;
  wherein the sensor automatically collects data of food at regular time intervals and sends the data to the cloud through an integrated communication module to perform predictive analytics;
wherein the anomaly in the data is predicted by the analytics module by analyzing a pattern of change in the data;
wherein the predictive analytics is performed through an artificial intelligence and a machine learning technique by adjusting a classifier and the method learns through a history of the data received in the cloud to perform the predictive analytics; and
wherein a thermodynamic heat flow model is used by the analytics module to analyze food temperature; and
wherein the method is configured to maintain the data of food within a pre-set range according to a food safety standard.

* * * * *